United States Patent [19]
Anzai et al.

[11] Patent Number: 6,016,248
[45] Date of Patent: Jan. 18, 2000

[54] HAND HELD TABLET COMPUTER HAVING EXTERNAL MECHANISMS FOR FACILITATING POSITIONING AND OPERATION

[75] Inventors: Masato Anzai, Machida; Nariaki Mieki, Yokohama; Yoshinari Toyosato, Yamato, all of Japan

[73] Assignee: International Business Machines Corporation, Armonk, N.Y.

[21] Appl. No.: 08/891,925

[22] Filed: Jul. 14, 1997

[30] Foreign Application Priority Data

Aug. 19, 1996 [JP] Japan ................................. 8-217559

[51] Int. Cl.[7] ................................. G06F 1/16; H05K 5/02
[52] U.S. Cl. ........................ 361/683; 361/681; 248/688; 248/463; 364/708.1
[58] Field of Search ................................. 361/683, 681, 361/680; 248/688, 463, 465, 188.6, 188.9, 922, 923; 364/708.1

[56] References Cited

U.S. PATENT DOCUMENTS

| | | | |
|---|---|---|---|
| 1,820,841 | 8/1931 | Soref | 248/463 |
| 3,878,964 | 4/1975 | Fogle | 220/96 |
| 4,356,991 | 11/1982 | Hutchinson | 248/463 |
| 5,247,428 | 9/1993 | Yu | 361/680 |
| 5,293,300 | 3/1994 | Leung | 361/683 |
| 5,327,322 | 7/1994 | Ma | 361/681 |
| 5,396,399 | 3/1995 | Blair et al. | 361/681 |
| 5,438,475 | 8/1995 | Bradley | 361/683 |
| 5,635,959 | 6/1997 | Takeuchi et al. | 345/179 |
| 5,661,632 | 8/1997 | Register | 361/683 |
| 5,675,524 | 10/1997 | Bernard | 364/705.05 |
| 5,712,760 | 1/1998 | Coulon et al. | 361/680 |

*Primary Examiner*—William Oen
*Assistant Examiner*—Jagdish. Patel
*Attorney, Agent, or Firm*—Bernard D. Bogdon

[57] ABSTRACT

An information processing apparatus which comprises a main body in a flat, plane box shape, a flat input section provided on the front surface of the main body, a stand, provided on the rear surface of the main body, having two or more tilting positions relative to the main body where it is preferable that the stand has a retracted position wherein the stand falls down into the rear surface of the main body, a first tilt position where the main body in-clines at a relatively small angle to a desk surface, and a second tilt position where the main body inclines at a relatively large angle to the desk surface. In the first tilting position, the main body is inclined slightly toward the front relative to the desk surface. With the main body thus positioned, it is easy to manipulate a pen held against the input face of the input section. In the second tilt position, the main body is held almost upright relative to the desk surface. When an external keyboard, for example, is attached to the main body for data input with the input section being used only as a display, and the main body is in the second tilt position, an operator can see the display easily while using the keyboard, and the computer's usability is enhanced. In the retracted position, the stand is fully retained in the rear surface of the main body, and the thickness of the main body is not expanded with the stand in this position, so that the computer can be carried or stored.

8 Claims, 15 Drawing Sheets

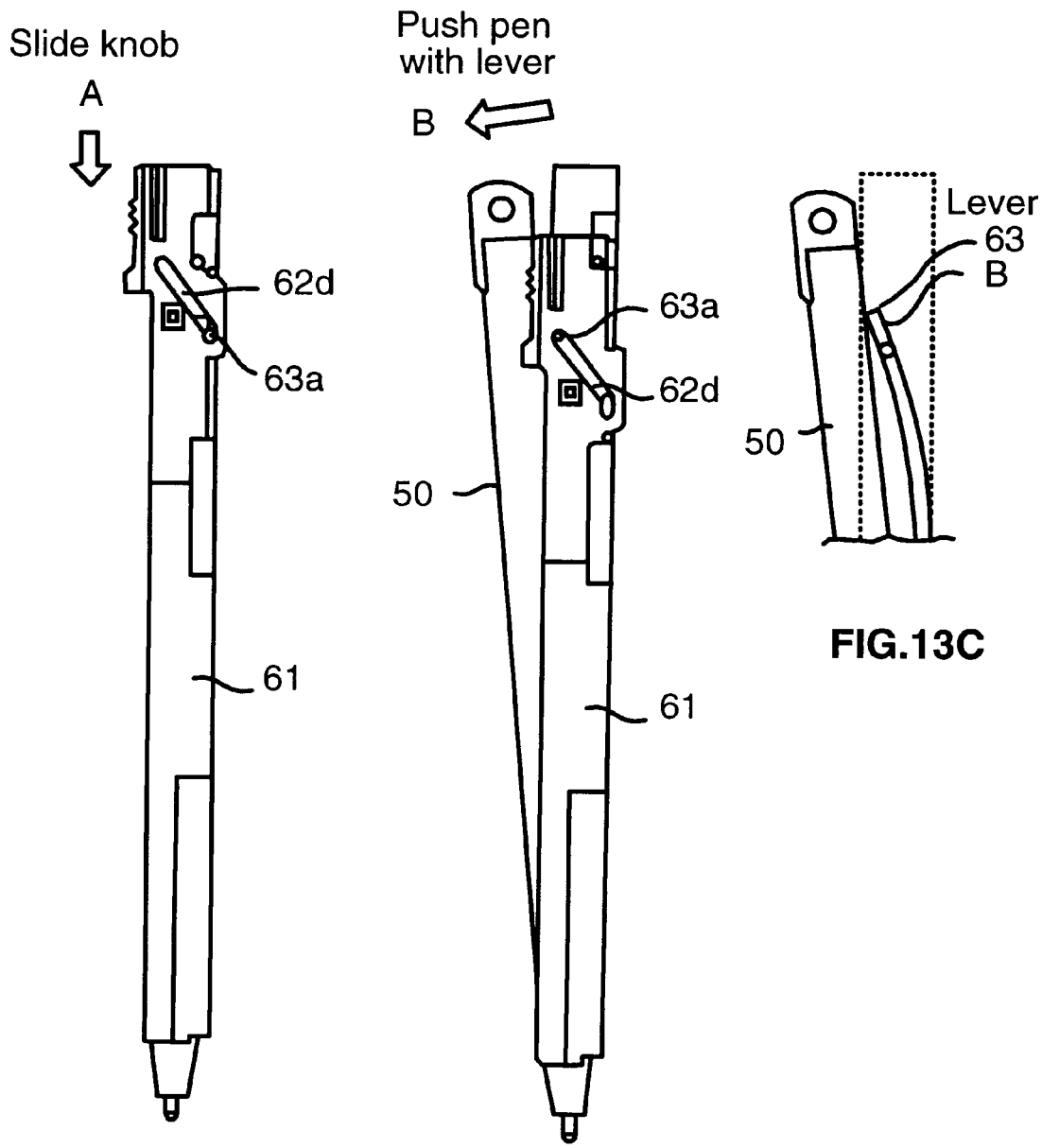

HAND HELD TABLET COMPUTER HAVING EXTERNAL MECHANISMS FOR FACILITATING POSITIONING AND OPERATION

BACKGROUND OF THE INVENTION

In accordance with recent technical development, portable computers that are compact, light and easy to carry have been produced and are available on the market. FIG. 20 is an outline diagram of a common portable computer (IBM ThinkPad 560 ("ThinkPad" is a trademark of IBM Corp.)). The computer includes a main body on which a keyboard unit is mounted, and a cover unit in which a liquid crystal display is provided. That is the portable computer has a clam shell structure where the cover unit is pivotaly hinged on the almost rear edge of the main body. The portable computer has, for example, an A4 or a B5 footprint, and weighs 2 kilo grams or less, and can be fit into a bag for carrying.

In accordance with the expanding needs of users, various forms of portable computers have been manufactured. Some portable computers have been designed that provide an input tablet on a liquid crystal display to enable pen input. A portable, tablet input type computer is disclosed in, for example, Japanese Patent Application No. Hei 4-301950 (Japanese Unexamined Patent Publication No. Hei 6-202806) which is assigned to the present assignee.

For the portable, tablet input type computer (hereinafter referred to as a "tablet computer"), as input means, a tablet replaces a keyboard. Therefore, a common tablet type computer, which has a flat, plane box shaped main body, does not have keyboards as standard equipment, and has a tablet that also serve as displays provided on their fronts. While an operator is looking at a tablet display of a tablet computer, the operator indicates a desired position by using a pen, instead of inputting at a desired key, to input data or commands.

The manner in which clam shell type portable computers are used is standardized. More specifically, when this type of computer is not being used, such as when it is being transported, the cover unit is closed to hide and protect the liquid crystal display and the keyboard surface which are relatively easily damaged by mechanical impact. When the computer is to be used, the main body is placed on the flat surface of a desk, or on a lap, and the cover unit is opened to permit viewing of the display and manipulation of the keyboard.

On the other hand, the manner in which the tablet computers are used is not always standardized. For a tablet computer, a pen may be used for data input, or an external keyboard unit may be attached for data input using keys. In the latter case, the tablet is used only as a display. The pen input operation may be performed on a desk, or by holding the pen in one hand and supporting the computer with the other hand.

Pen input operation is relatively easy with a tablet computer having a main body in a flat, plane box shape when the computer is placed flat on a desk. Because an operator can manipulate a pen while looking down at the tablet display. However, for data input using an external keyboard, an operator must view a display, lying flat on a desk, at an acute angle, and this arrangement makes the operation difficult. Especially for a display that has a narrow visual angle, an operator is forced to take an unnatural posture in order to perform key input while viewing the display.

In addition, even for performing pen input on a desk, it is evident that, from the aspect of human engineering, an input face that is slightly inclined toward an operator provides better usability than does a flat input face.

In short, the conventional tablet computer having a main body in a flat, plane box shape is satisfactory only for pen input on a desk, and is not suitable when used in other ways.

Various "tilting mechanisms" for inclining a keyboard toward the front relative to a horizontal face have been proposed for the conventional clam shell portable computers. In, for example, the specification for Japanese Patent Application No. Hei 3-290406 (Japanese Unexamined Patent Publication No. Hei 5-119885) is disclosed a tilting mechanism constituted by a pair of folding stand provided on the bottom of a portable computer. Such a tilting mechanism effectively enhances the usability for key input. The tilting mechanisms, however, generally have a single tilting angle, and are not satisfactory for use when a computer is supported by one hand and a pen is held in the other hand. The tilting mechanisms were originally provided to incline the typing face of the keyboard, not for providing an enhanced tablet data input operation. When a tablet is used as a display that is inclined at only a small angle by the folding stand, it is difficult for an operator to see the display. In order to make the above described inventions suitable for the other applications, such as for tablet input, or for use as a display, it is desirable that different types of stands having different lengths be prepared.

It is, therefore, one object of the present invention to provide a superior tablet type information processing apparatus having a main body in a flat, plane box shape.

It is another object of the present invention to provide an improved information processing apparatus that can also be appropriately employed in several ways, such as for tablet input or for key input with a keyboard.

SUMMARY OF THE INVENTION

To achieve the above objects, according to the present invention, an information processing apparatus comprising: a main body in a flat, plane box shape; a flat input section provided on the front surface of the main body; a stand, provided on the rear surface of the main body, having two or more tilting positions relative to the main body. The flat input section is, for example, a tablet that also serves as a display, and data can be input using a pen. The tablet may be either an electromagnetic induction type or a pressure sensitive type.

It is preferable that the stand has a retracted position wherein the stand falls down into the rear surface of the main body, a first tilt position where the main body inclines at a relatively small angle to a desk surface, and a second tilt position where the main body inclines at a relatively large angle to the desk surface. In the first tilting position, the main body is inclined slightly toward the front relative to the desk surface (see FIG. 16). With the main body thus positioned, it is easy to manipulate a pen held against the input face of the input section. In the second tilt position, the main body is held almost upright relative to the desk surface (see FIG. 17). When a keyboard unit (an external keyboard), for example, is attached to the main body for data input with the input section being used only as a display, and the main body is in the second tilt position, an operator can see the display easily while using the keyboard, and the computer's usability is enhanced. Since in the retracted position, the stand is fully retained in the rear surface of the main body, and the thickness of the main body is not expanded with the stand in this position, so that the computer can be carried or stored.

The stand includes: a handle, fabricated by bending a rod into a U shape; a pair of shafts, one formed at either end of the handle; bearings formed at the rear surface of the main body, for rotatively supporting the pair of shafts; a tongue piece, rotatively attached to the handle at almost the center of the U shape; and an engagement portion formed at the rear surface of the main body, for engaging a tip of the tongue piece in the first tilt position. The bearings generate a friction having a predetermined resistive force, or greater, relative to the rotation of the handle.

In the U shape handle fabrication configuration, the first tilt position is provided by opening the handle until it describes an acute angle with the rear face of the main body, and then directing the tip of the tongue piece toward the rear face and engaging it with the engagement portion (see FIG. 16). As is apparent from FIG. 16, at the first tilt position, great gravitational moment is imposed at the center of gravity of the main body, and the handle in the inclined state can not be supported by only the force of the friction supplied by the bearings. The tip of the tongue piece, therefore, is brought into contact with the engagement portion to prevent the handle from falling.

The second tilt position is provided by opening the handle until it describes an obtuse angle with the rear face of the main body (see FIG. 17). As is apparent from FIG. 17, at the second tilt position, a smaller gravitational moment is imposed at the center of gravity of the main body, and the handle in the inclining state can be adequately supported by only the force of the friction supplied by the bearings.

The U-shaped handle can also be used as a handle for holding the main body. As is shown in FIG. 18, for example, an operator holds the main body by inserting one hand (not usually the dominant hand) through the U-shaped handle, and can enter data with a pen while holding the main body in the palm (palmtop operation). The handle can also be used as a hook for suspending the main body from a wall (see FIG. 19).

Since this structure can be provided by combining relatively simplistic parts, it is superior as regards manufacturing costs, weight and durability, and has no adverse effect on portability.

That is, according to the present invention, an information processing apparatus can be provided that can be appropriately employed for tablet input or key input by attaching a keyboard.

The main body may include a pen attachment portion on one side. The pen attachment portion comprises: a pen storage portion recessed along the side of the main body; an insertion portion, formed at one end of the pen storage portion, into which a pen tip is inserted; a slide knob formed to slide longitudinally along the pen storage portion; and a lever for transforming a substantially linear movement of the slide knob toward the tip of the pen into a substantially rotational movement of the pen at the tip of the pen, and for pushing the pen forward. The structured pen attachment portion can enhance usability, and as it can be provided by combining uncomplicated parts, it is superior as regards manufacturing cost, weight and durability.

The main body may have a PC card slot in its top. Some types of PC cards, such as a LAN card, that are to be inserted into the slot have a cable extending from the end. If the slot is formed on the left or right side and the connector for the cable is on the opposite side, the cable must be carried around the main body, and the installation is inconvenient. When the slot is formed in the top, the cable can be relatively freely extended in every direction, and the installation problem can be reduced.

The main body may include battery storage sections in substantially lower portions on both sides. Generally, a minimum two hour battery operation period is required for a portable device, and at least four battery cells must be employed. However, for an information processing apparatus having a B5 footprint or smaller, while taking other incorporated parts into consideration, it is difficult to obtain, at one location, the relatively large amount of space needed to hold four battery cells. In this invention, therefore, the battery storage sections are formed in the lower portions of the respective sides of the main body. Design restrictions can be eased by providing two separate storage sections. Although the battery cells are heavier than the other electronic parts and the casing, they are uniformly located at the lower positions on both sides so as to maintain the weight balance of the main body.

The other objects, features, and advantages of the present invention will become apparent in due course during the detailed description of the embodiment of the present invention, which will be given while referring to the accompanying drawings.

BRIEF DESCRIPTION OF THE DRAWINGS

The invention is pointed out with particularity in the appended claims. The stated advantages of the invention may be better understood by referring to the following detailed description in conjunction with the drawings in which:

FIG. 13 is a diagram showing the operation of the pen attachment portion, with FIG. 13(a), more specifically, showing the condition where a pen is retained, FIG. 13(b) showing the condition where a slide knob is moved to remove the pen, and FIG. 13(c) being an enlarged diagram showing a lever when the pen is removed.

DETAILED DESCRIPTION OF THE PREFERRED EMBODIMENT

Figure 1:
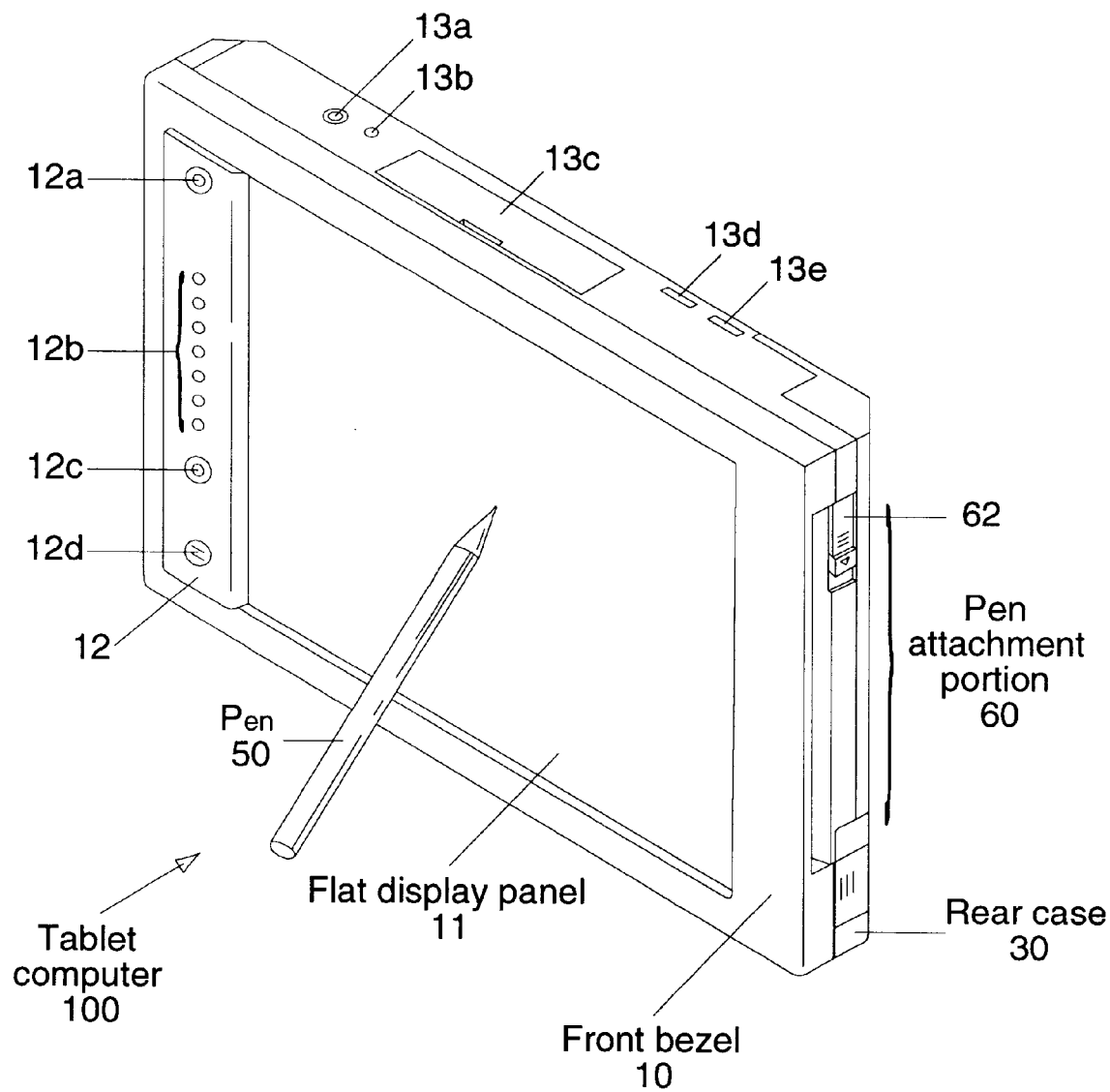
FIG. 1 is a front perspective view of a tablet computer that is appropriate for carrying out the present invention.

The preferred embodiment of the present invention will now be described while referring to the accompanying drawings.

A. External appearance of tablet computer

FIGS. 1 through 7 are diagrams illustrating the external appearance of a tablet computer 100 that embodies the present invention. The respective sections are described as follows.

Outline of computer body:

The computer 100 is a portable computer that can be driven by incorporated batteries (not shown), and has a system main body in a flat, plane box shape with a B5 footprint or smaller. As is apparent from FIG. 1, the computer body is constituted by a front bezel 10 that supports a flat display panel 11, and a shallow rear case 30. In the space enclosed by the front bezel 10 and the rear case 30 are a system board (not shown), on which a CPU, various controller chips and memory are mounted, and in which a hard disk drive (not shown), as an external storage device is accommodated. The computer 100 is so designed that it can perform data processing.

The flat display panel 11 is made by laminating an input tablet over a liquid crystal display (LCD), and supports the handwriting input function for which a pen 50 is used. The input tablet can be either an electromagnetic induction type or a pressure sensitive type. An operator can input data and commands directly via the flat display panel 11 by using the pen 50.

Figure 2:
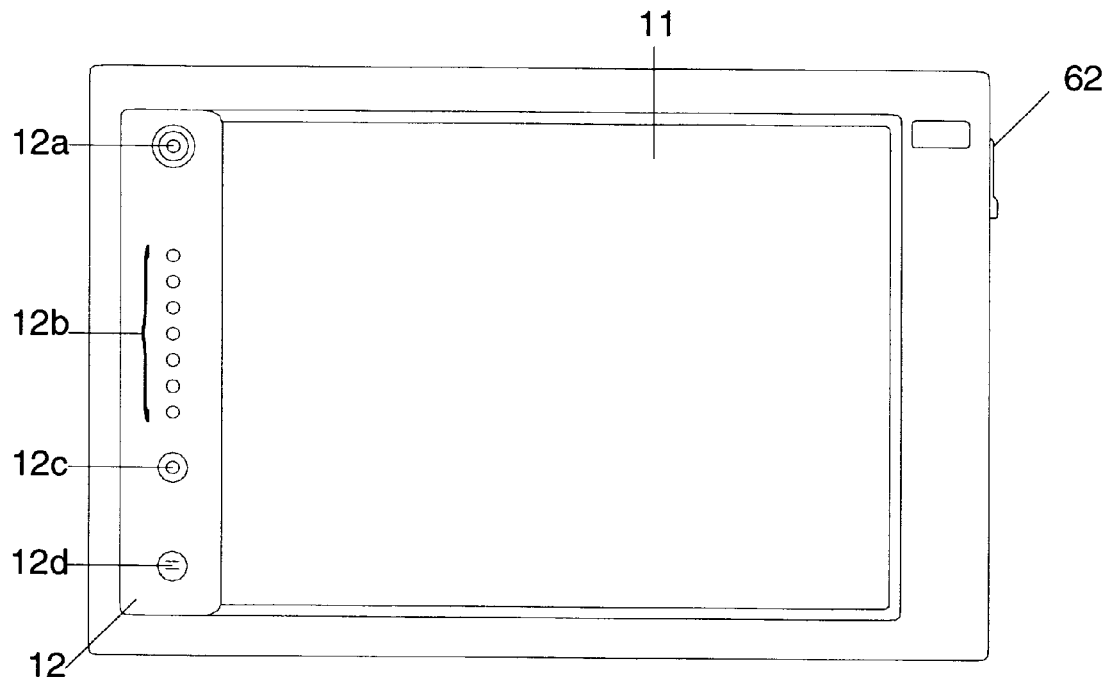
FIG. 2 is a front view of the computer.

Front face of computer body:

As is apparent from FIGS. 1 and 2, there is a raised portion 12, substantially as wide as a thumb, along the left edge of the flat display panel 11 on the top face of the front bezel 10. On the raised portion 12 are provided a power switch 12a, for turning power on and off; an LED indicator set 12b, for displaying a system operating state; a suspend switch 12c; and a microphone 12d, for audio input. The LED indicators 12b indicate operating states, such as the accessing of an HDD (not shown), battery charging and a remaining battery capacity. The suspend switch 12c is a control switch for entering the system to a power saving state, called a "suspend mode," and for resuming the system to the normal operating state. Before the system enters the suspend mode, necessary system data are saved in advance in a backup memory. When the system is to be resumed to the normal operating mode, the saved data are restored in their original locations, and the interrupted task is re-started.

Figure 3:
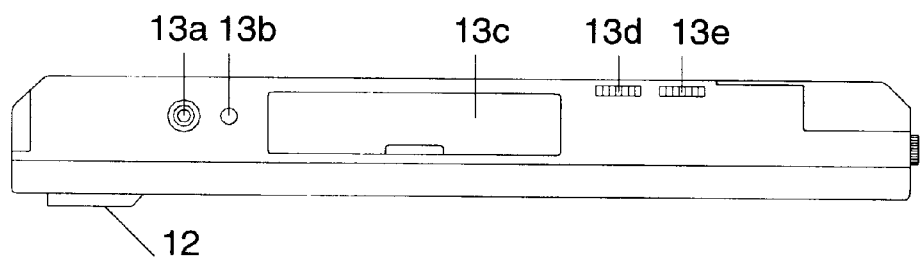
FIG. 3 is a plan view of the computer.

Top face of computer body:

As is apparent from FIGS. 1 and 3, in the top of the computer body are formed a microphone jack 13a, a headphone jack 13b, a PC card slot cover 13c, a contrast adjustment dial 13d, and a volume adjustment dial 13e. The contrast adjustment dial 13d is used to adjust screen contrast for the flat display panel 11, with the rotational movement of the dial 13d being transmitted to an internal inverter (not shown). The volume adjustment dial 13e is used to control the volume of a loudspeaker, which will be described later, with the rotational movement of the dial 13e is transmitted to an internal audio amplifier (not shown).

Figure 8:
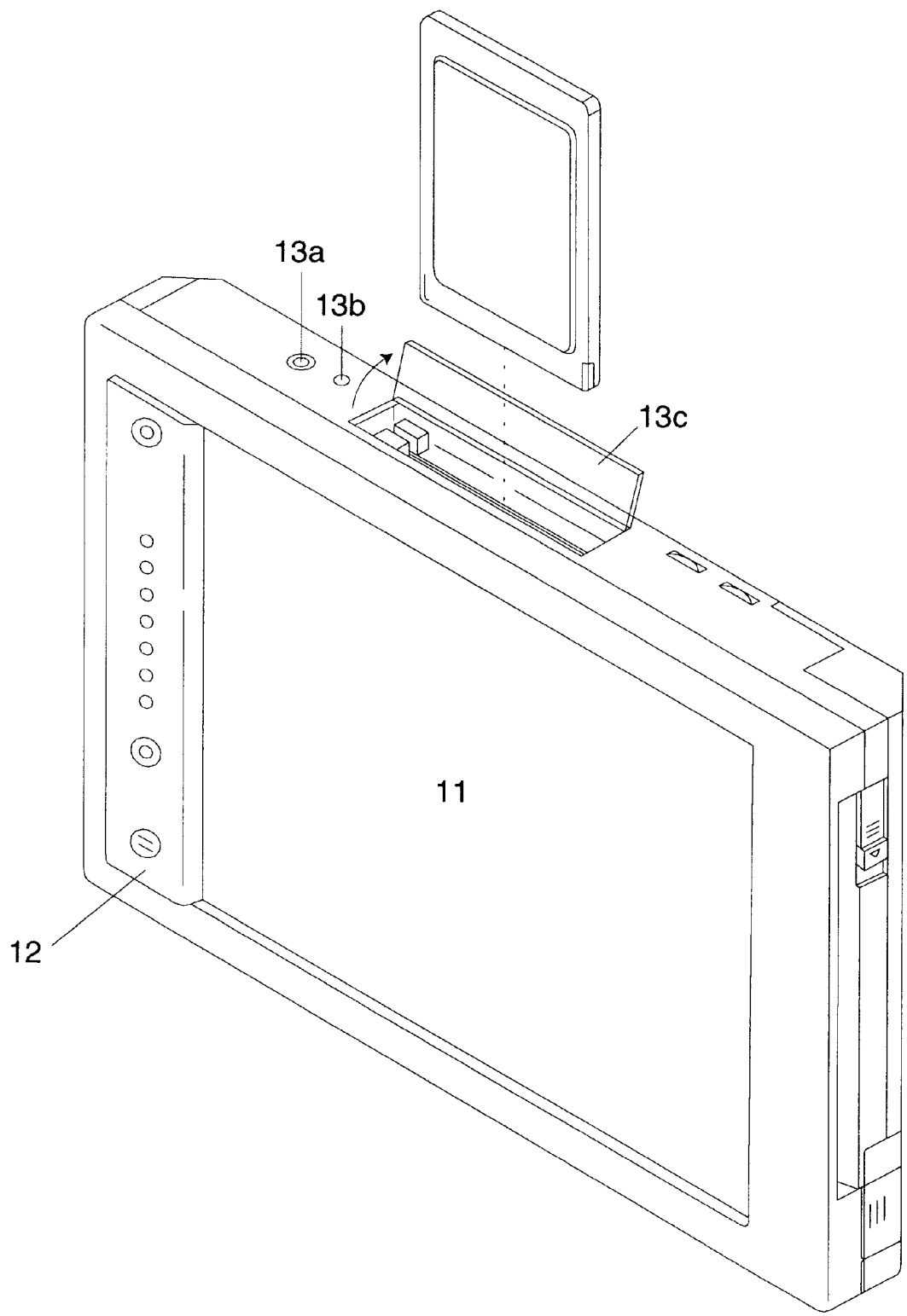
FIG. 8 is a diagram showing a PC card slot and its periphery on the top face of the computer.

The PC card slot cover 13c is so attached to the top face of the main body that it can be freely opened and closed. An operator can open the cover 13c by, for example, hooking his or her finger nail into a notch at the front edge of the cover 13c (see FIG. 8). A PC card that conforms to the standards specified by the PCMCIA/JEIDA can be inserted through the PC card slot. In this embodiment, two PC cards of type /, or one PC card of type can be employed. Some PC cards, such as LAN cards (e.g., Tokenring cards or Ethernet cards), that are inserted through the card slot have cables extending from their ends. If the PC card slot were formed on the right or the left side, and the connector for such cable were located on the opposite side, the cable would have to be carried around the main body and its installation would be inconvenient. In this embodiment, however, since the card slot is formed on the top face, the cable can be therefore relatively freely extended in every direction, and the installation problem can be reduced.

Figure 4:
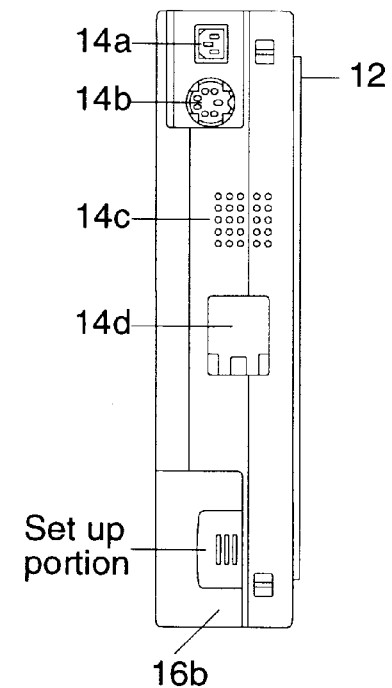
FIG. 4 is a view of the left side of the computer.

Left side of computer body:

As is shown in FIG. 4, on the left side of the computer body are provided a DC inlet 14a, an external keyboard port 14b, a loudspeaker 14c, and a modem/fax port 14d.

Figure 9:
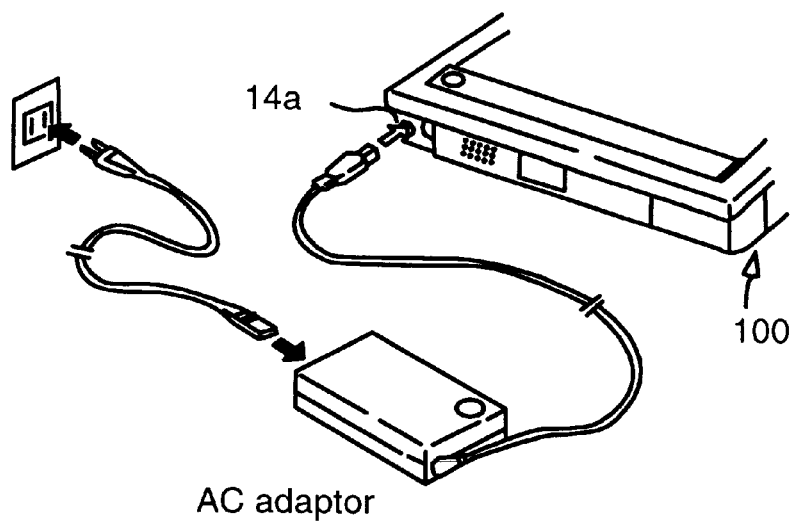
FIG. 9 is a diagram showing the condition when power is to be supplied from a commercially available source to the computer via an AC adaptor.
Figure 10:
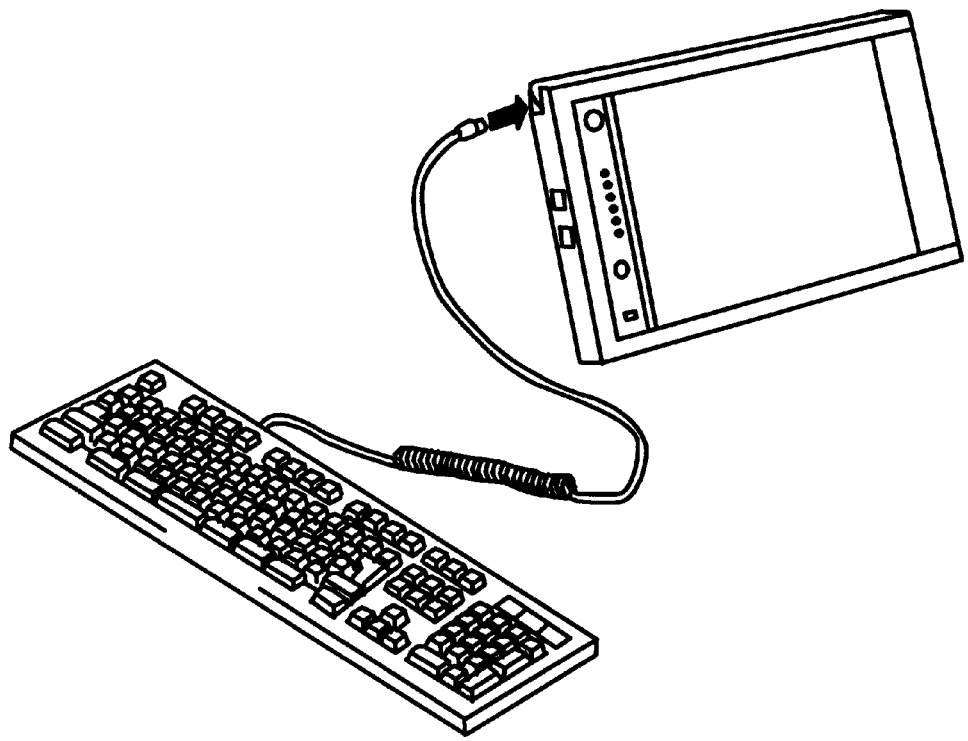
FIG. 10 is a diagram showing the condition when an external keyboard is to be connected to the computer.
Figure 11:
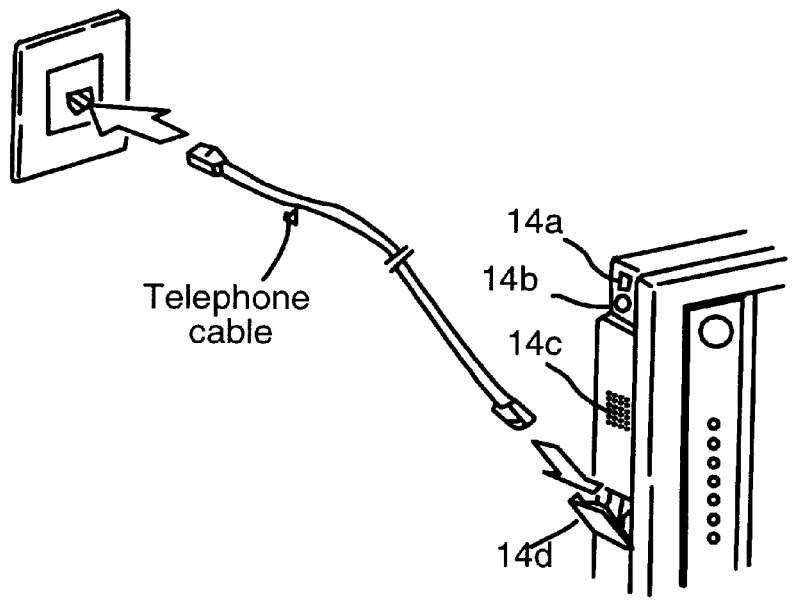
FIG. 11 is a diagram showing the condition when a telephone cable/fax cable is to be connected to the computer.

An AC adaptor cable can be connected to the DC inlet 14a, so that the computer 100 can be powered by a commercially available power source via the AC adaptor (see FIG. 9). An external keyboard can be connected to the external keyboard port 14b, as is shown in FIG. 10, and the computer 100 can also serve as a display for a key input type computer. The modem/fax port 14d has a cover that can be opened and closed. When the cover is opened to an angle of approximately 45°, a jack for a telephone cable or a fax cable can be obliquely inserted (see FIG. 11). A jack cover similar to that shown in FIG. 11 is disclosed in the specification of Japanese Patent Application No. Hei 6-279510 (Japanese Unexamined Patent Publication No. Hei 8-138796) which is assigned to the present assignee.

Figure 5:
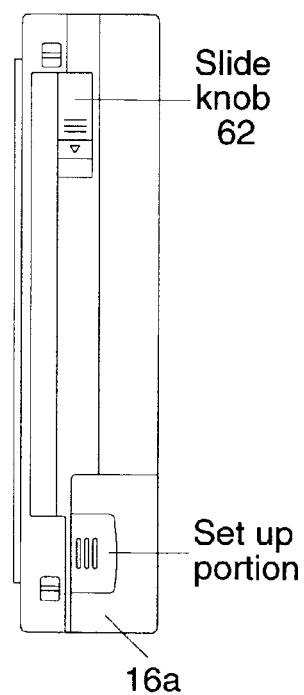
FIG. 5 is a view of the right side of the computer.

Right side of computer body:

As is shown in FIGS. 1 and 5, a pen attachment portion 60 is provided on the right side of the computer body for the attachment thereto of the pen 50 for tablet input. The provision of the pen attachment portion 60 makes it possible for the pen 50 to be carried with the computer 100.

Figure 12:
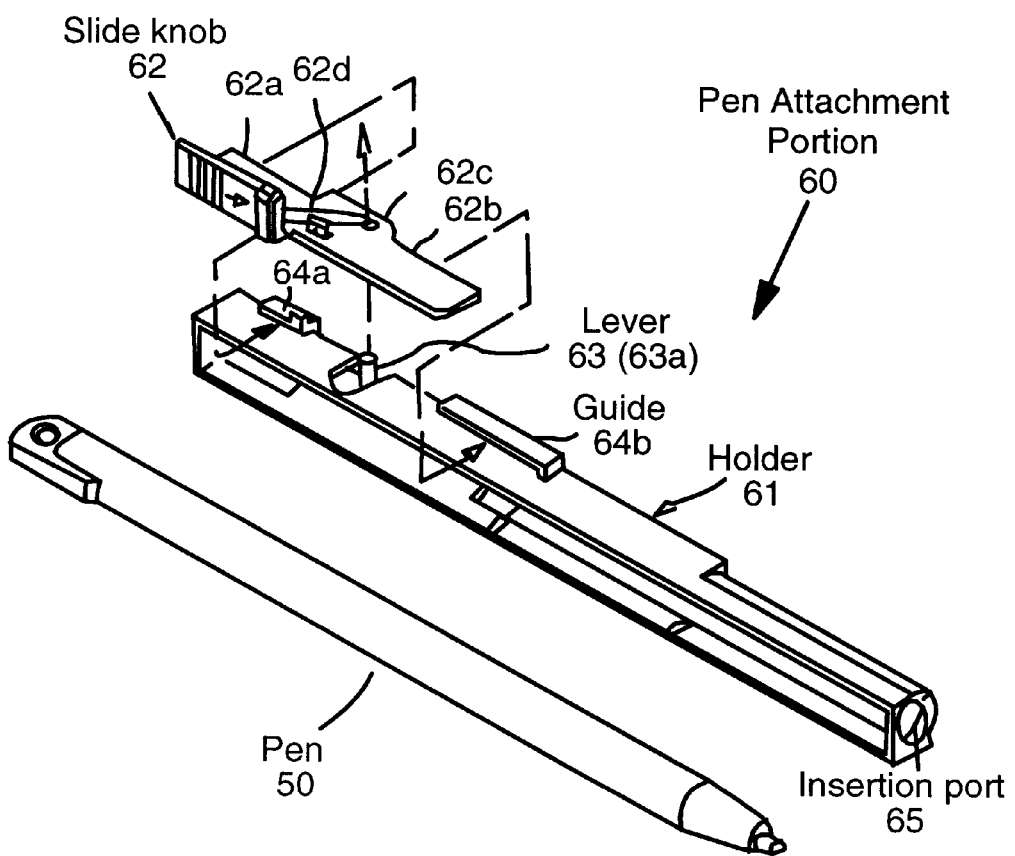
FIG. 12 is a detailed diagram showing the structure of a pen attachment portion.

FIG. 12 is a detailed diagram illustrating components of the pen attachment portion 60, and the assembly structure. The pen attachment portion 60 is constituted by a holder 61, for retaining the pen 50, and a slide knob 62.

The holder 61 is an elongated, coverless box large enough to hold the pen 50, and is embedded in a groove formed in the right side of the computer body, as is shown in FIG. 1. An insertion port 65 is formed in one end of the holder 61 in which the tip of the pen 50 is inserted. A flexible lever 63 is integrally formed with the bottom of the holder 61. A protrusion 63a is formed on the upper edge of the lever 63, and projects outward through a notch in the upper face of the holder 61. A pair of guides 64a and 64b are formed on the upper face of the holder 61. Formed in the guides 64a and 64b are dovetailed grooves, in which the side edges of the slide knob 62 are held to control the longitudinal movement of the slide knob 62, which will be described later.

The slide knob 62 includes a knob body, which is exposed on the surface of the computer body and which an operator can manipulate, and a plate having a convex shape, which is formed perpendicular to the knob body. A linear slot 62d is obliquely formed substantially in the center of the plate, and the projection 63a of the lever 63 is inserted through the linear slot 62d. As bottom portions 62a and 62b of the plate slide in the dovetailed grooves of the corresponding guides 64a and 64b of the holder 61, the slide knob 62 is moved in the longitudinal direction. In addition, since the convex portion 62c is held by the sides of the guides 64a and 64b, the distance the slide knob 62 moves is defined.

FIGS. 13(a) through 13(c) are diagrams illustrating step by step the operating states for the pen attachment portion 60. In FIG. 13(a) is shown the state where the pen 50 is completely enclosed by the holder 61. When the slide knob 62 is moved in the direction indicated by the arrow A, the protrusion 63a of the lever 63 slides along the linear slot 62d, as is shown in FIG. 13(b). As a result, as is shown in FIG. 13(c), the lever 63 is bent in the direction indicated by the arrow B, i.e., toward outside, and contacts the pen 50 and pushes it outward.

It will be understood by one having ordinary skill in the art that the structured pen attachment portion 60 can be provided by combining parts of uncomplicated design and configuration, and is superior as regards manufacturing costs, weight and durability.

Figure 7:
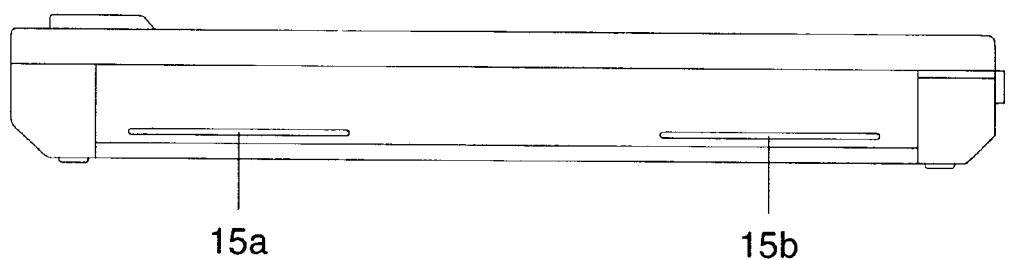
FIG. 7 is a view of the bottom of the computer.

Bottom face of computer body:

As is shown in FIG. 7, linear protrusions 15a and 15b are formed on the bottom face of the computer body. When the computer body is set at the second tilt position, i.e., when it is raised substantially upright relative to the support face on which the computer is installed, the linear protrusions 15a and 15b contact the support face.

Rear face of computer body:

As is shown in FIGS. 4 through 7, battery covers 16a and 16b are so provided on both lower side portions of the rear face of the computer body that they can be freely opened and closed.

Figure 14A:
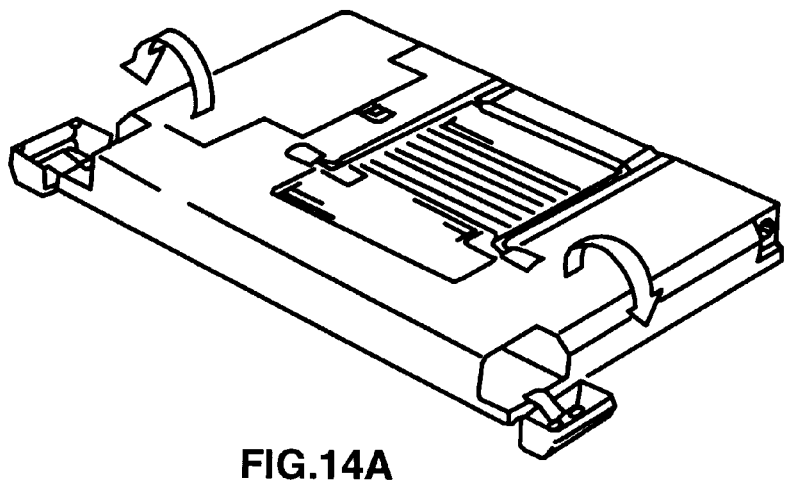
FIG. 14 is a diagram showing battery storage sections that are provided on both lower sides of the rear face of the tablet computer, with FIG. 14(a), more specifically, showing the condition when battery covers are open, FIG. 14(b) showing the condition when battery packs are inserted into the respective storage sections, and FIG. 14(c) showing the condition when the battery covers are to be closed.

Portions having a plurality of linear narrow protrusions are provided on the sides of the battery covers 16a and 16b. An operator grasps these portions with fingers and pulls them in the directions indicated by arrows in FIG. 14(a) to open the battery covers 16a and 16b.

Figure 14B:
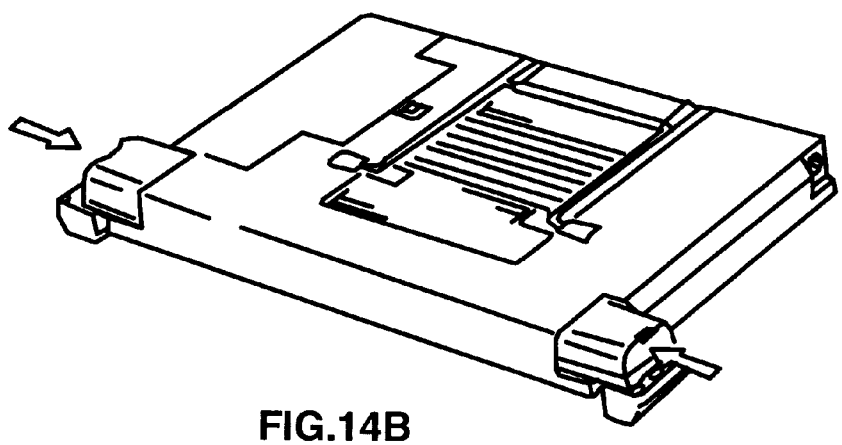
Figure 14C:
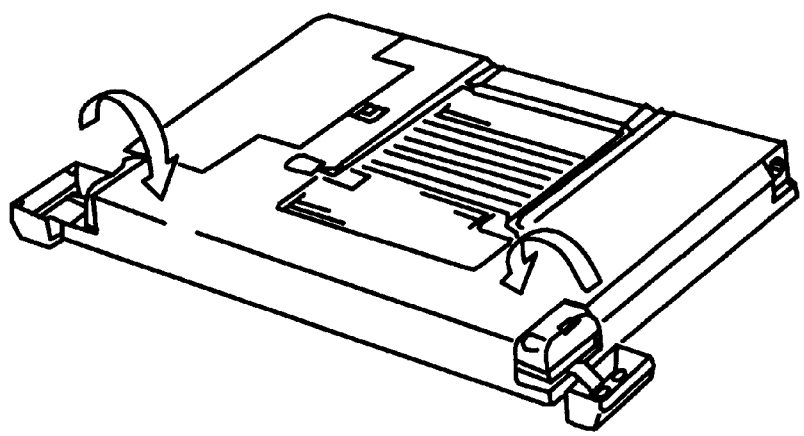

When the battery covers 16a and 16b are open and battery storage sections are exposed, battery packs having the same shape and size can be inserted into the battery storage sections in the directions indicated by the arrows in FIG. 14(b). Finally, the battery covers 16a and 16b are moved in the directions indicated by the arrows in FIG. 14(c) to shield the storage sections.

Generally, a minimum two hour battery operation period is required for a portable computer, and at least four battery cells must be employed. However, since the computer 100 is so designed that it has a B5 footprint or smaller, while taking into consideration the arrangement of other built-in components, it is difficult to obtain, at one location, the relatively large amount of storage space needed to hold four battery cells. This is why the battery storage sections are provided in the lower side portions of the computer body. For this arrangement, the location restrictions can be eased. Although the battery cells are heavier than the other parts, they are uniformly located at the lower positions on both sides to maintain the weight balance of the computer body.

Figure 6:
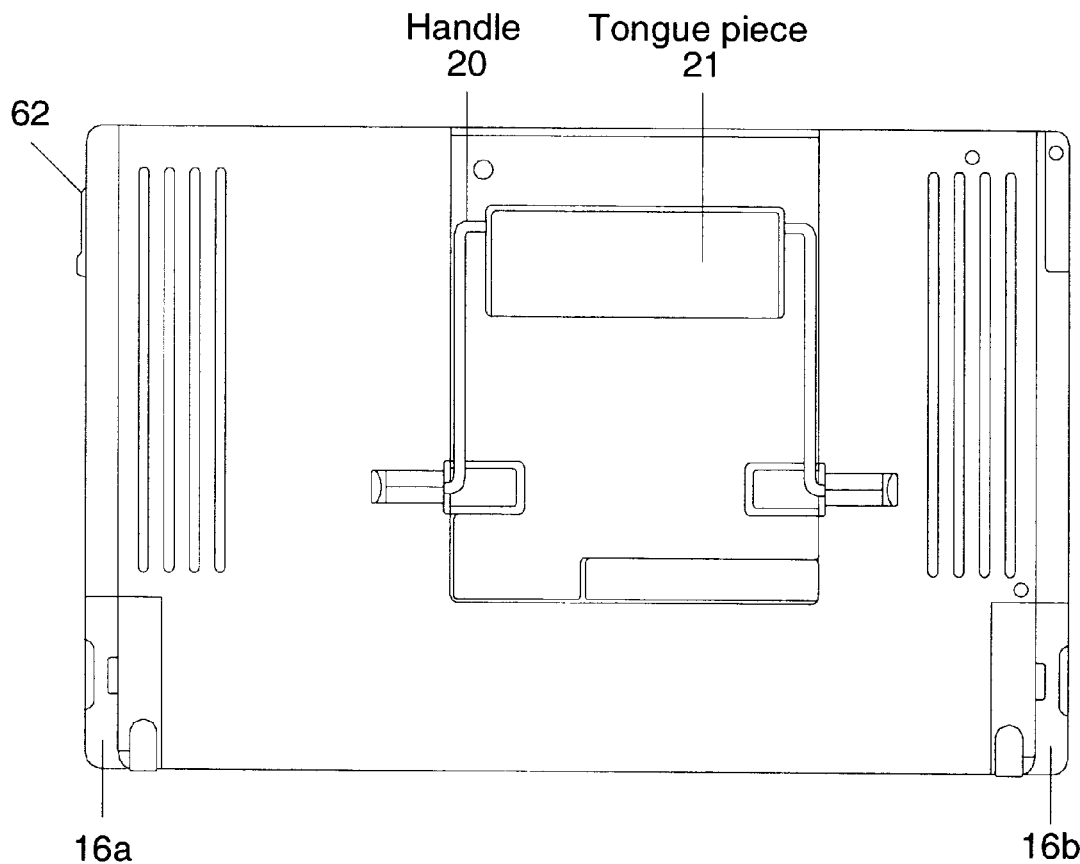
FIG. 6 is a view of the rear of the computer.

As is shown in FIG. 6, a plurality (four on each side) of relatively long linear protrusions are formed along the sides of the rear face of the computer body, and extend in the direction of the height of the computer body. When an operator holds the computer body with one hand, these linear protrusions effectively prevent the computer from slipping off the hand.

Figure 15:
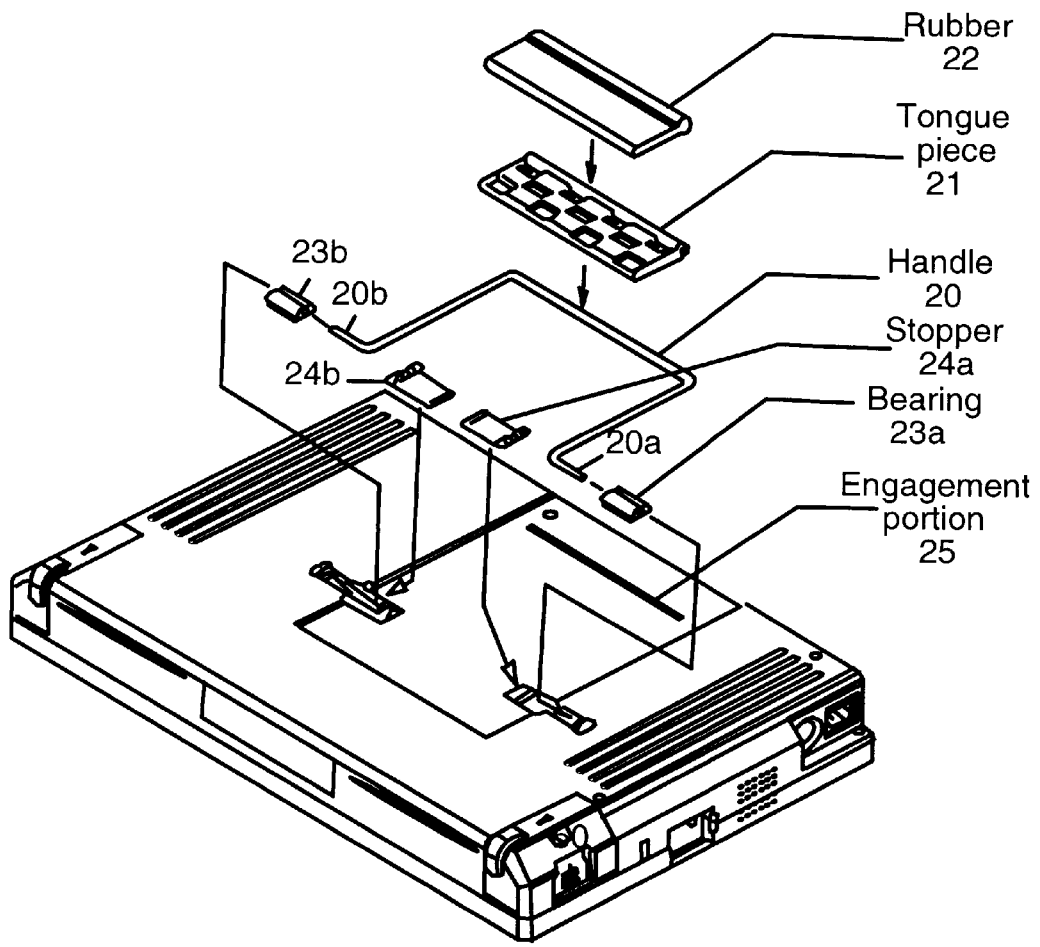
FIG. 15 is a diagram showing the assembly of a handle and associated parts.

Further, as is shown in FIG. 6, a handle 20 made of a U-shaped rod is attached substantially in the center of the rear face so that it is rotatable relative to the rear face. FIG. 15 is a diagram showing the assembly of the handle 20 and its peripheral parts.

The handle 20 is an approximately 2.6 mm diameter rod and is made of fine, strong material, such as piano wire, stainless steel or aluminum. Both ends of the U-shaped handle 20 are bent in the direction of the rotational axis of the handle 20 to provide shafts 20a and 20b. The handle 20 can serve as a stand or a hand strap, or as a hook for hanging the computer on a wall, which will be explained later.

Bearings 23a and 23b have elongated holes through which the shafts 20a and 20b of the handle 20 are inserted. The bearings 23a and 23b are fixed in predetermined positions on the rear face of the computer body by respective stoppers 24a and 24b. Since the bearings 23a and 23b caulk the shafts 20a and 20b, friction having a predetermined resistive force, or greater, acts to restrict the rotation of the handle 20.

A tongue piece 21 is a plate member, along one side of which is formed a narrow groove having the same width as that of the handle 20. Since the narrow groove supports the center of the handle 20 and a rubber sheet 22 encloses the tongue piece 21, the tongue piece 21 is rotatively attached to the handle 20. The tongue piece 21 is also used as a stand for supporting the inclined computer body for a pen-input operation. When the computer is employed as a display, the tongue piece 21 stabilizes the handle 20, which serves as the stand for the computer and which will be described later. In addition, as the rubber sheet 22 is elastic, it can serve as a stand stopper, and can also serve as a buffer member when the handle 20 is used as a hand strap to reduce the stress imposed on an operator's hand.

A linear engagement protrusion 25 is formed on the rear face of the computer body. The engagement protrusion 25 is used to hold the distal end of the tongue piece 21 at the first tilt position, which will be explained in detail later.

B. Tilting mechanism for the tablet computer:

For the computer 100 in this embodiment there are a plurality of ways in which the handle 20 can be used. The respective ways in which it can be used will now be explained in detail while referring to FIGS. 16 through 19.

Use during pen input (first tilt position):

When the tablet computer 100 is employed for pen input at a desk, for an operator it is preferable that, relative to the desk surface, the flat display panel 11 be slightly inclined toward the front, i.e., that the computer 100 be set at the first tilt position, so that he or she can easily move the pen 50 thereon.

Figure 16A:
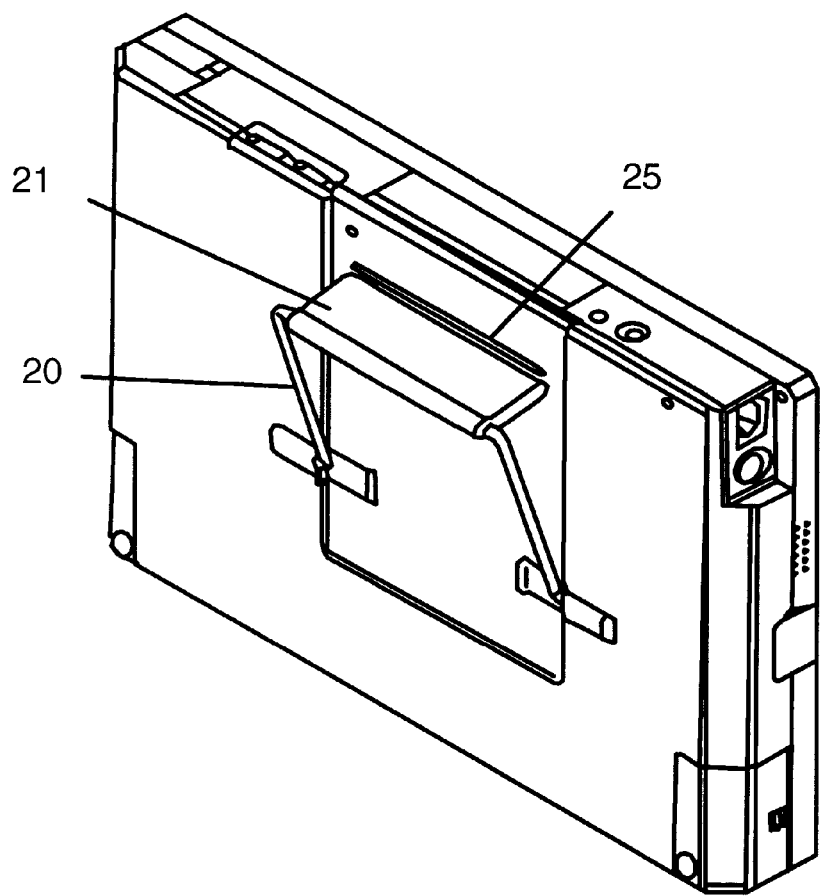
FIG. 16 is a diagram showing the tablet computer when it is used for pen input, with FIG. 16(a) being a rear perspective view and FIG. 16(b) being a left side view.
Figure 16B:
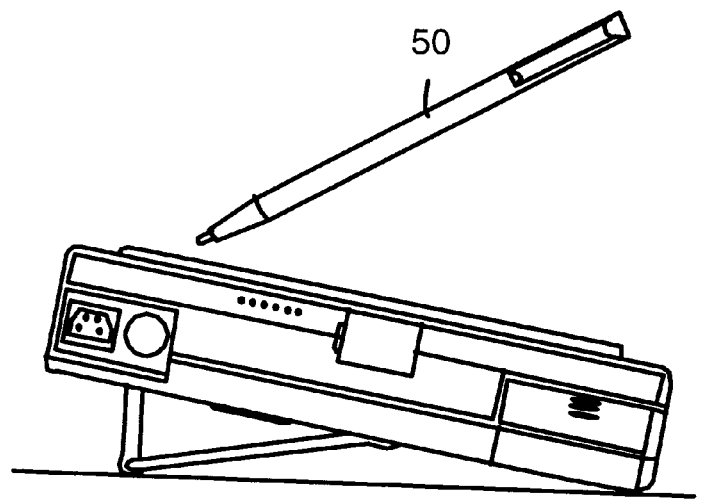

In FIG. 16 is shown the tablet computer 100 when it is used for pen input. At the first tilt position, the handle 20 is opened until it describes an acute angle with the rear face of the computer 100, and the distal end of the tongue piece 21 is directed toward the rear face of the computer 100 and fitted over the engagement protrusion 25. In other words, the tongue piece 21 serves as a stand for the computer body.

At the first tilt position, large gravitational moment is imposed at the center of gravity of the computer 100, and the inclined state of the handle 20 can not be maintained by only the force of the friction supplied by the bearings 23a and 23b. In this embodiment, therefore, to maintain the first tilt position, the tongue piece 21 is fitted over the engagement protrusion 25 to halt the rotation of the handle 20 and the tongue piece 21.

Use as display (second tilt position):

When the tablet computer 100 is employed as a display, i.e., when it serves not only as the main body but also as a display device, for an operator it is preferable that the flat display panel 11 stand substantially upright relative to the desk surface, i.e., the computer 100 is set at the second tilt position, so that he or she can easily see the display. In this case, an external keyboard may be provided for the computer 100 (see FIG. 10), especially for key input.

Figure 17A:
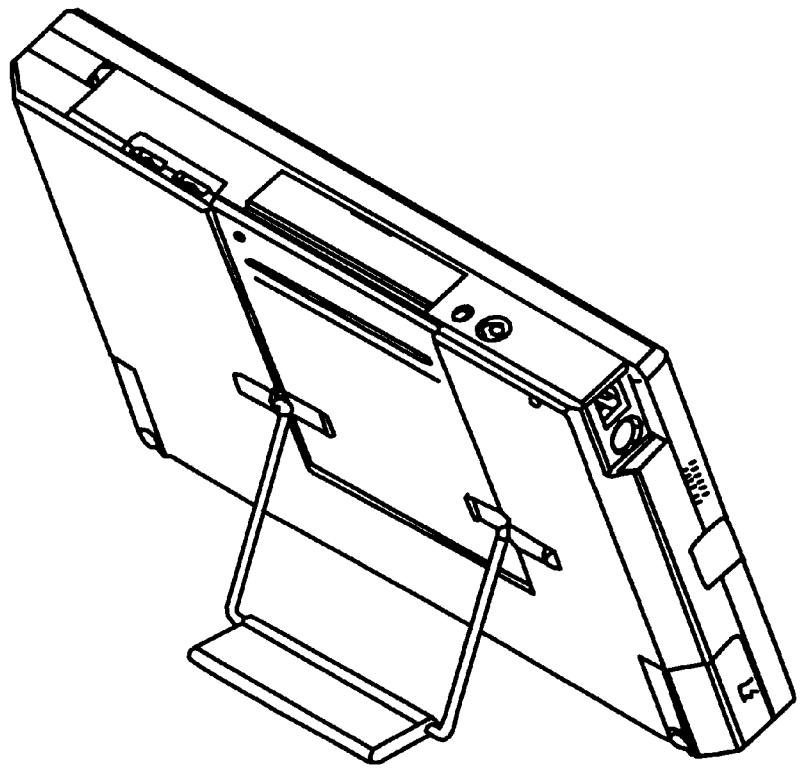
FIG. 17 is a diagram showing the tablet computer when it is used as a display, with FIG. 17(a) being a rear perspective view and FIG. 17(b) being a left side view.
Figure 17B:
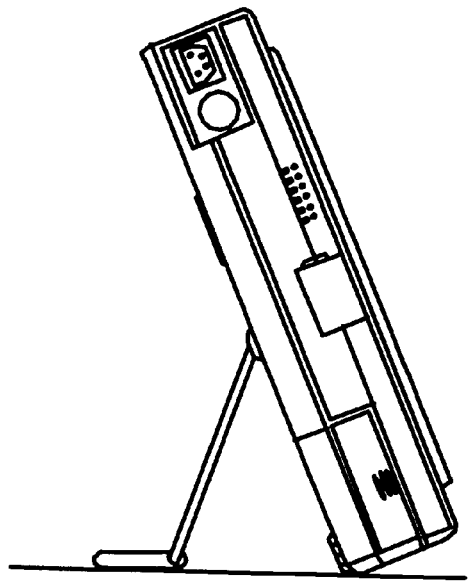

FIG. 17 is a diagram showing the computer 100 when it is used as a display. At the second tilt position, the handle 20 is opened until it describes an obtuse angle with the rear face of the computer 100. In other words, the handle 20 serves as a stand for the computer 100.

At the second tilt position, a smaller gravitational moment is imposed at the center of gravity of the computer 100, and the handle 20 in the inclined state can be adequately supported by only the force of the friction supplied by the bearings 23*a* and 23*b*. Since the rubber sheet 22 is elastic, it acts as a stand stopper.

Use as a handy-use type computer:

The handle 20 in this embodiment, formed into a U shape, can also be used as a handle. An operator supports the computer 100 by inserting one hand (not the dominant hand) through the U-shaped handle 20, and can enter data with the pen 50 while holding the computer 100 in the palm (palmtop operation).

Figure 18A:
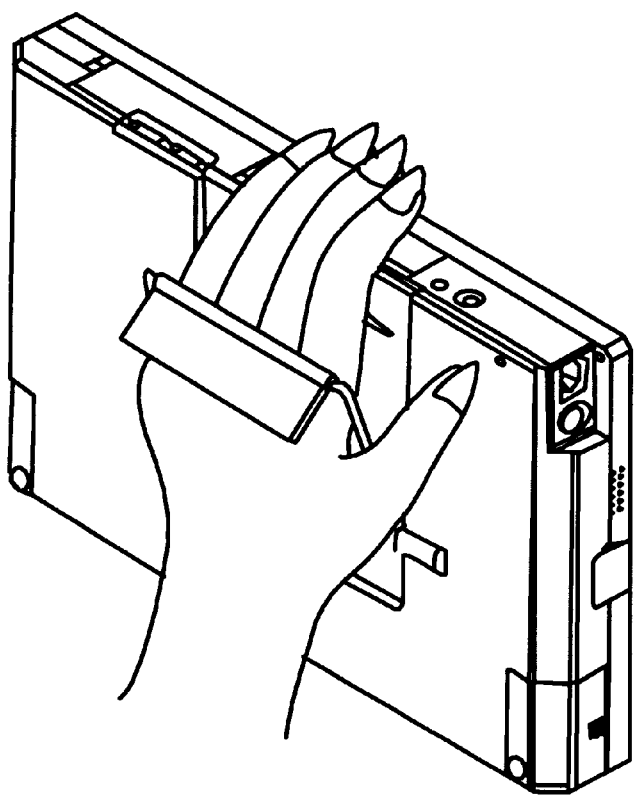
FIG. 18 is a diagram showing the tablet computer 100 when it is used as a handy-use type, with FIG. 18(a) being a rear perspective view and FIG. 18(b) being a left side view.
Figure 18B:
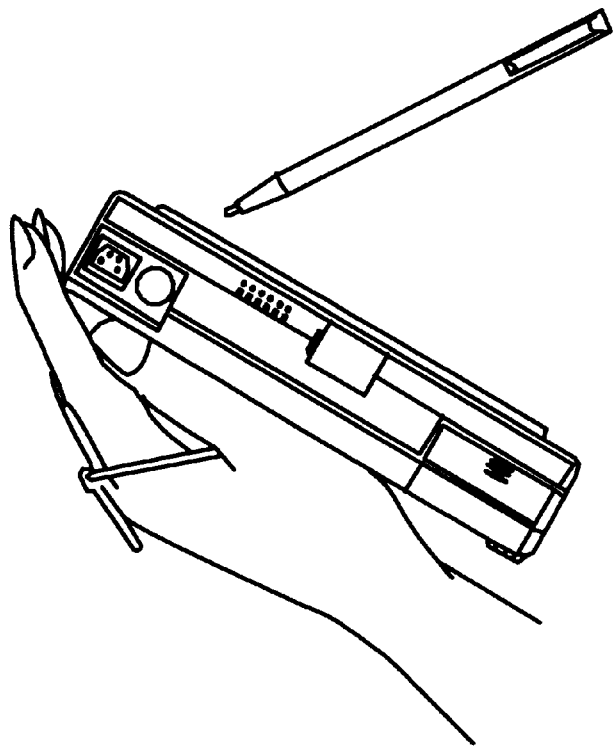

In FIG. 18 is shown the way in which the computer 100 is employed as a handy-use type. Since the elastic rubber sheet 22 can function as a buffer member when the handle 20 is used as a hand strap, the stress imposed on the operator's hand can be reduced.

Wall suspension:

The U-shaped handle 20 in this embodiment can also be employed as a hook to suspend the computer 100 from a wall.

Figure 19A:
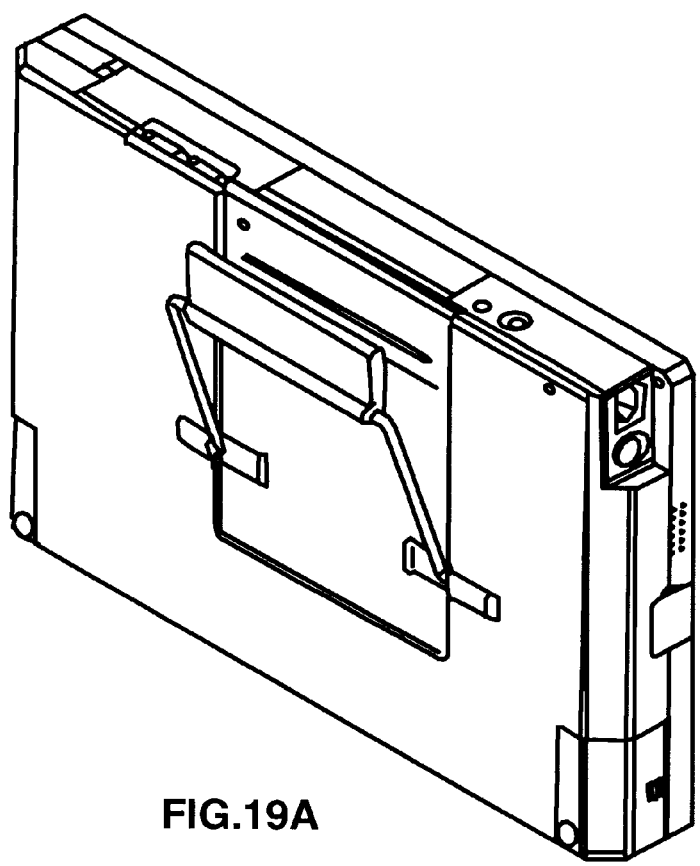
FIG. 19 is a diagram showing the tablet computer when it is used as a wall suspended type, with FIG. 19(a) being a rear perspective view and FIG. 19(b) being a left side view.
Figure 19B:
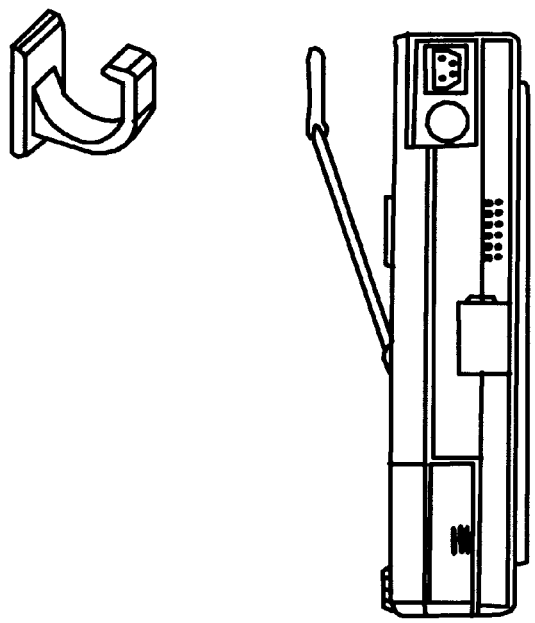
Figure 20:
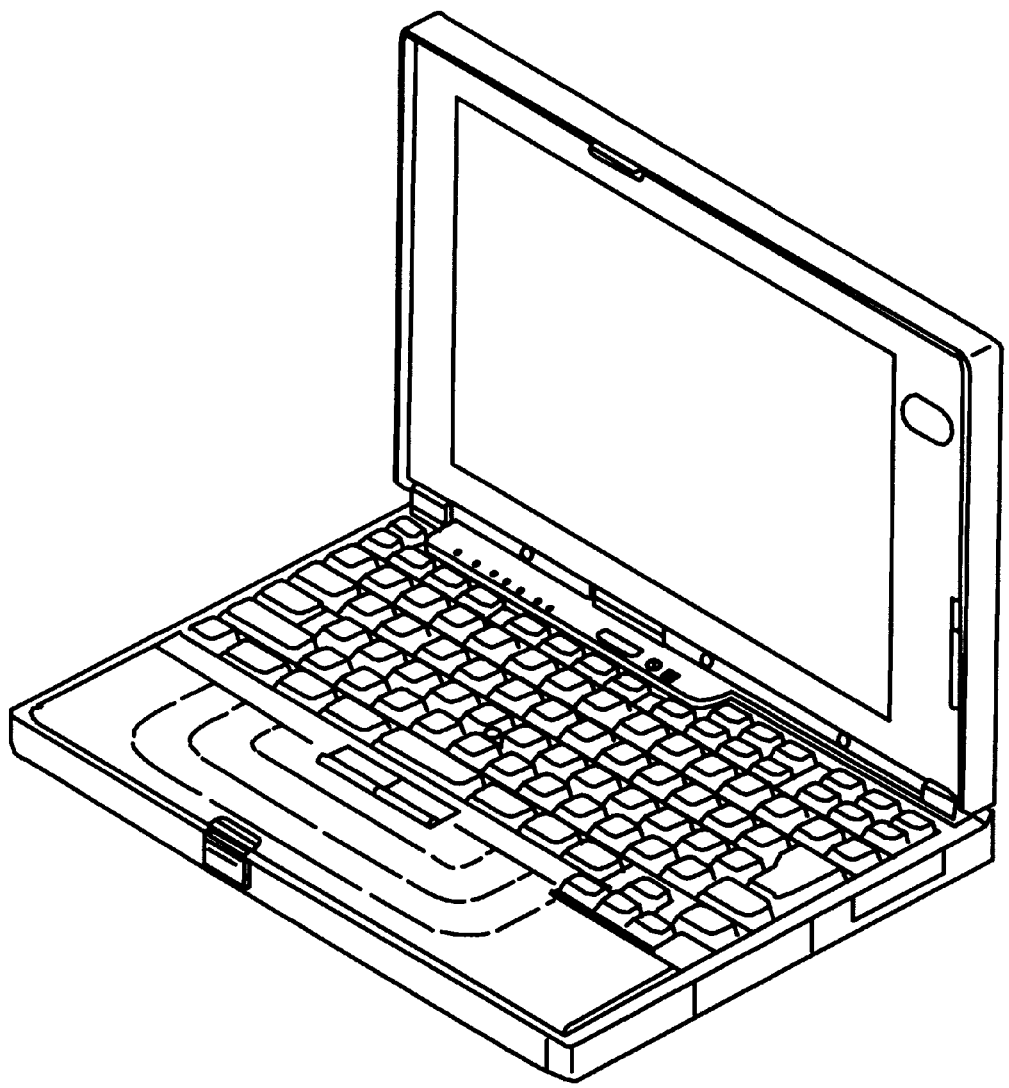
FIG. 20 is an outline diagram of a common portable computer.

In FIG. 19 is shown the way in which the computer 100 is suspended from a wall. The handle 20 is positioned in the same manner as in FIG. 18, and the center of the handle 20 is placed over a wall hook.

With the arrangement described in sub-division A, the assembly of the simple parts provides a plurality of ways in which the handle 20 can be used, as described in sub-division B. It should be fully noted that the tilting mechanism of the computer 100 according to this embodiment is superior as regards manufacturing costs, weight and durability, and has no adverse effect on portability.

The present invention has been described in detail while referring to a specific embodiment. However, it should be obvious to one having ordinary skill in the art that various modifications or revisions of the embodiment are possible within the scope of the present invention. That is, although the present invention has been disclosed by using an example, it should not be limited to that example. To fully understand the subject of the present invention, the claims should be referred to.

As is described above in detail, according to the present invention, provided is an information processing apparatus that can be appropriately employed in several ways, such as for tablet input or for key input with a keyboard.

That which is claimed:

1. An information processing apparatus comprising:
    a main body in a flat plane box shape;
    a flat input section provided on the front surface of the main body;
    a stand, provided on the rear surface of the main body, having two or more tilting positions relative to the main body and including a handle, formed of a U shaped rod; a pair of shafts, one formed at either end of the handle; bearings formed at the rear surface of the main body, for rotatively supporting the pair of shafts; a tongue piece, rotatively attached to the handle at approximately the center of the U shape of the rod; and an engagement portion formed at the rear surface of the main body, for engaging a tip of the tongue piece in the first tilt position.

2. The information processing apparatus according to claim 1, wherein the bearings formed at the rear surface of the main body generate a friction having a resistive force relative to the rotation of the handle.

3. The information processing apparatus according to claim 2, wherein the main body includes a pen attachment portion on one side of the main body.

4. The information processing apparatus according to claim 3, wherein the main body has a PC card slot on top of the main body.

5. The information processing apparatus according to claim 3, wherein the main body includes battery storage sections in substantially lower portions on both sides of the main body.

6. The information processing apparatus according to claim 1, wherein the flat input section serves also as a display.

7. The information processing apparatus according to claim 1, wherein the main body has a PC card slot on top of the main body.

8. The information processing apparatus according to claim 1, wherein the main body includes battery storage sections in substantially lower portions on both sides of the main body.

* * * * *